(12) United States Patent
Beck et al.

(10) Patent No.: US 6,206,092 B1
(45) Date of Patent: Mar. 27, 2001

(54) 4 ZONE HEATING OR AIR CONDITIONING UNIT FOR A MOTOR VEHICLE

(75) Inventors: Oliver Beck, Sindelfingen-Hinterweil; Ian Bendell, Mönsheim; Prasanta Halder, Ditzingen-Heimerdingen; Hans Kampf, Korb; Karl Lochmahr, Vaihingen; Kurt Molt, Bietingheim-Bissingen; Joachim Zeeb, Echterdingen, all of (DE)

(73) Assignee: Behr GmbH & Co., Stuttgart (DE)

( * ) Notice: Subject to any disclaimer, the term of this patent is extended or adjusted under 35 U.S.C. 154(b) by 0 days.

(21) Appl. No.: 08/965,962

(22) Filed: Nov. 7, 1997

(30) Foreign Application Priority Data

Nov. 8, 1996 (DE) .............................. 196 46 123

(51) Int. Cl.[7] .................................................. F25B 29/00
(52) U.S. Cl. ........................ 165/203; 165/204; 165/42; 165/43; 237/12.3 B; 237/12.3 A; 454/156
(58) Field of Search .................. 165/203, 41, 42, 165/43; 237/12.3 B, 12.3 A; 454/156

(56) References Cited

U.S. PATENT DOCUMENTS

| 4,417,688 | * | 11/1983 | Schnaibel et al. | 165/203 |
|---|---|---|---|---|
| 4,482,009 | | 11/1984 | Nishimura et al. | 165/41 |
| 4,537,245 | * | 8/1985 | Nishimura et al. | 165/203 |
| 4,712,608 | * | 12/1987 | Arold et al. | 165/41 |
| 4,881,456 | * | 11/1989 | Yasuda et al. | 165/203 |
| 4,949,779 | * | 8/1990 | Kenny et al. | 165/203 |
| 5,016,704 | | 5/1991 | Ono | 165/1 |
| 5,086,628 | * | 2/1992 | Hashimoto | 165/203 |
| 5,181,553 | * | 1/1993 | Doi | 165/203 |
| 5,199,485 | * | 4/1993 | Ito et al. | 165/203 |
| 5,337,802 | * | 8/1994 | Kajino et al. | 165/203 |
| 5,765,635 | * | 6/1998 | Rhee | 165/203 |

FOREIGN PATENT DOCUMENTS

| 3514359 | * | 10/1986 | (DE) | 165/203 |
|---|---|---|---|---|
| 36 10 188 A1 | | 1/1987 | (DE) . | |
| 3940361 | * | 6/1991 | (DE) . | |
| 39 40 361 A1 | | 6/1991 | (DE) . | |
| 2717747 | * | 9/1995 | (FR) . | |
| 0122213 | * | 7/1983 | (JP) | 165/43 |
| 58-136813 | * | 9/1983 | (JP) . | |
| 0261514 | * | 11/1987 | (JP) . | |
| WO 96/29211 | * | 9/1996 | (WO) . | |

* cited by examiner

*Primary Examiner*—John K. Ford
(74) *Attorney, Agent, or Firm*—Foley & Lardner

(57) ABSTRACT

A conditioned air unit for use in a motor vehicle providing heating or cooling to a plurality of regions having relatively independent temperature setting. The structure provides compact, flexible and convenient temperature conditioning for each region.

6 Claims, 3 Drawing Sheets

4 ZONE HEATING OR AIR CONDITIONING UNIT FOR A MOTOR VEHICLE

BACKGROUND OF THE INVENTION

1. Field of the Invention

A heating or air conditioning unit for a motor vehicle having a plurality of independent temperature control regions.

2. Description of Related Art

U.S. Pat. No. 4,482,009 discloses a conventional heating or air conditioning unit, including a fan and a heater, which divides the airstream downstream of the heater. Two ducts leading to the vehicle front compartment distribute conditioned air to the regions for the driver seat and passenger seat, and two ducts leading to the vehicle rear compartment distribute conditioned air to the regions for the seat behind the driver and the seat behind the passenger. Air control elements arranged at the branching points of the air ducts control the quantity of air supplied to each region; however, independent temperature control is only possible between the front and rear zones. Additional air control elements provided further downstream allow the air stream to the front zone to mix with the air stream to the rear zone; however, temperature control is still dependent on the position of the air quantity control elements for the other regions.

DE-A 39 40 361 discloses another conventional heating or air conditioning unit providing conditioned air to the rear zone of a motor vehicle. A first air duct conducts cold air and a second air duct conducts hot air. Air from the first and second ducts is combined in a mixing chamber so as to set the desired temperature of the air stream that goes to the rear zone. One disadvantage of this conventional arrangement is a duct conducting conditioned air to the foot region of the rear zone branches off from the hot air duct upstream of the mixing chamber, hence its temperature is dependent on the temperature setting in the front zone. Another disadvantage is the considerable amount of space required in the rear zone to control the amount of air to the rear zone.

SUMMARY OF THE INVENTION

An object of the invention is to provide a heating or air conditioning unit for a vehicle having a plurality of different regions in front and rear sections on both sides of a passenger compartment. A further object of the invention is to provide improved temperature setting convenience by providing a temperature setting for each region which is independent of the temperature setting in any other region, and to provide a space-saving construction.

A particular advantage of the invention is that the temperature can be individually set in a simple manner for at least four conditioned air regions in the motor vehicle passenger compartment. The temperature of the air stream leading to a conditioned air region is set directly in close proximity to a heater unit, thereby avoiding interaction or exchange between air streams of different conditioned air regions. Consequently, a separate temperature setting for different regions in each of four sections of the passenger compartment (e.g. driver side front seat, driver side rear seat, passenger side front seat, and passenger side rear seat) can be achieved without being influenced by the temperature setting for any other region.

Another advantage of the present invention is that the temperature setting for each region is established in close proximity to the heater unit. Therefore, obtaining separate temperature settings for at least four conditioned air regions does not require any more space than is required by conventional heating and air conditioning units to obtain separate temperature settings for only two conditioned air regions.

According to one embodiment of the present invention, the heater unit is divided into four heater core segments through which separate portions of an input air stream are conducted. Each portion of the air stream is conducted in a separate duct, which prevents mixing with other portions of the air stream.

According to another embodiment of the present invention, a single heater unit is vertically and horizontally separated into the four heater core segments. A central coolant tank vertically separates the heater unit into symmetrical side portions. Co-planar, parallel coolant tanks are arranged at distal ends of both side portions with respect to the central coolant tank. A horizontal partition divides each of the side portions into upper and lower segments.

According to yet another embodiment, the coolant carrying tubes of the heater in a lower segment include airstream turbulence inducing elements for increasing thermal transmission in the lower segment with respect to the upper segment, thereby obtaining a comparatively higher temperature setting.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out in the appended claims.

BRIEF DESCRIPTION OF THE DRAWINGS

The accompanying drawings, which are incorporated into and constitute a part of the specification, illustrate a presently preferred embodiments of the invention, and, together with the general description given above and the detailed description of the preferred embodiment given below, serve to explain the principles of the invention.

DETAILED DESCRIPTION OF THE PREFERRED EMBODIMENTS

Figure 1:
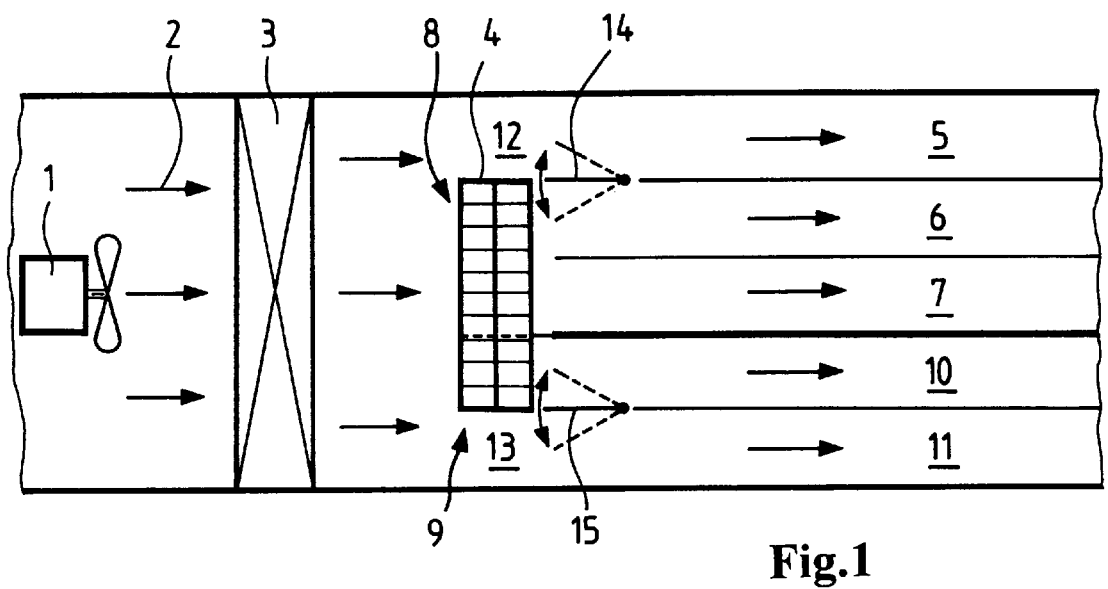
FIG. 1 is a schematic illustration of a conditioned air unit according to a first embodiment of the present invention.

One half of a conditioned air unit for a motor vehicle is illustrated schematically in FIG. 1. The conditioned air unit is configured symmetrically with respect to a vertical center plane, so that temperatures for the right and left sides of the occupant compartment can be independently set. Thus, the half of the conditioned air unit illustrated in FIG. 1 is equally applicable for providing conditioned air to either of the right or left sides of the occupant compartment.

A conditioned air unit 100 according to the present invention is illustrated in FIG. 1. A fan 1 moves an input air stream 2 through the conditioned air unit 100. The source of the input air stream 2 can either be fresh-air from outside the occupant compartment or air recirculated from inside the occupant compartment. A flap (not illustrated) controls the source of the input air stream 2. The input air stream 2 passes through a refrigerant evaporator 3 for cooling the input air stream 2 to a given temperature. Downstream of the evaporator 3 is a heater unit 4. Generally, the heater unit 4 comprises a liquid-to-air type heat exchanger, and preferably the liquid is engine coolant. However, other types of heat exchangers or heat sources are contemplated. The heater unit 4 may comprise either a single heater core or a plurality of heater core segments fitted together in a modular manner.

Downstream of the heater unit 4, a plurality of ducts lead to corresponding outlet nozzles (not shown) for supplying conditioned air to separate regions in the occupant compartment of the motor vehicle. A ventilation duct 5, a defroster duct 6, and a foot duct 7 conduct conditioned air to a front section of one side of the vehicle. The ducts 5, 6, and 7 are associated with an upper segment 8 of the heater 4; however, the ventilation duct 5 is adjacent a side wall of a housing 110, and the air stream conducted by the ventilation duct 5 does not pass through the heater 4.

Associated with a lower segment 9 of the heater 4 are a foot duct 10 and a ventilation duct 11 for conducting conditioned air to a rear section of the same side of the vehicle. As with the front zone ventilation duct 5, the ventilation duct 11 is adjacent a side wall of a housing 110, and the air stream conducted by the ventilation duct 11 also does not pass through the heater 4. Generally, the defroster duct 6 is for conducting conditioned air to an upper region of the front section, and the ventilation ducts 5,11 are for conducting conditioned air to regions within their respective sections which are relatively higher in the passenger compartment than the regions receiving conditioned air conducted by the foot ducts 7,10.

The illustrated arrangement of the ducts 5–7, 10 and 11 makes independent temperature setting simple.

Arranging the ventilation ducts 5,11 adjacent the side walls of the housing 110 permits cooled air leaving the refrigerant evaporator 3 to circumvent the heater 4 through respective bypasses 12,13.

One or more air valves, or mixing flaps, 14,15 are arranged directly adjacent to the heater 4 in air distribution chamber(s). The air valves flaps 14,15 set the quantity of air and/or the air temperature. As illustrated, the air valve flap 14 makes it possible to set the temperature of the air streams in the ventilation duct 5 and the defroster duct 6 for the front section, and the air valve 15 makes it possible to set the temperature of the air streams in foot duct 10 and the ventilation duct 11 for the rear section.

The front section foot duct 10 is arranged centrally and receives an air stream which is temperature-conditioned directly by the heater unit 4.

In a preferred embodiment, the temperature of the heater unit 4 is controlled with liquid valves 60–64 for controlling the flow of engine coolant through the heater unit 4. opening and closing the liquid valves 60–64 regulates the flow of coolant through each segment of the heater unit 4, thereby enabling different temperature settings in each segment of the heater unit 4. As can be seen from FIGS. 1 and 4, the temperature in each of the foot duct 10 and the ventilation duct 11 can be independently set using the liquid valves 60 and 62, and the air valve 15. Similarly, the temperature in each of the ducts 5, 6 and 7 leading to the front section can be independently set using the liquid valves 60 and 62, and the air valve 14.

Figure 3:
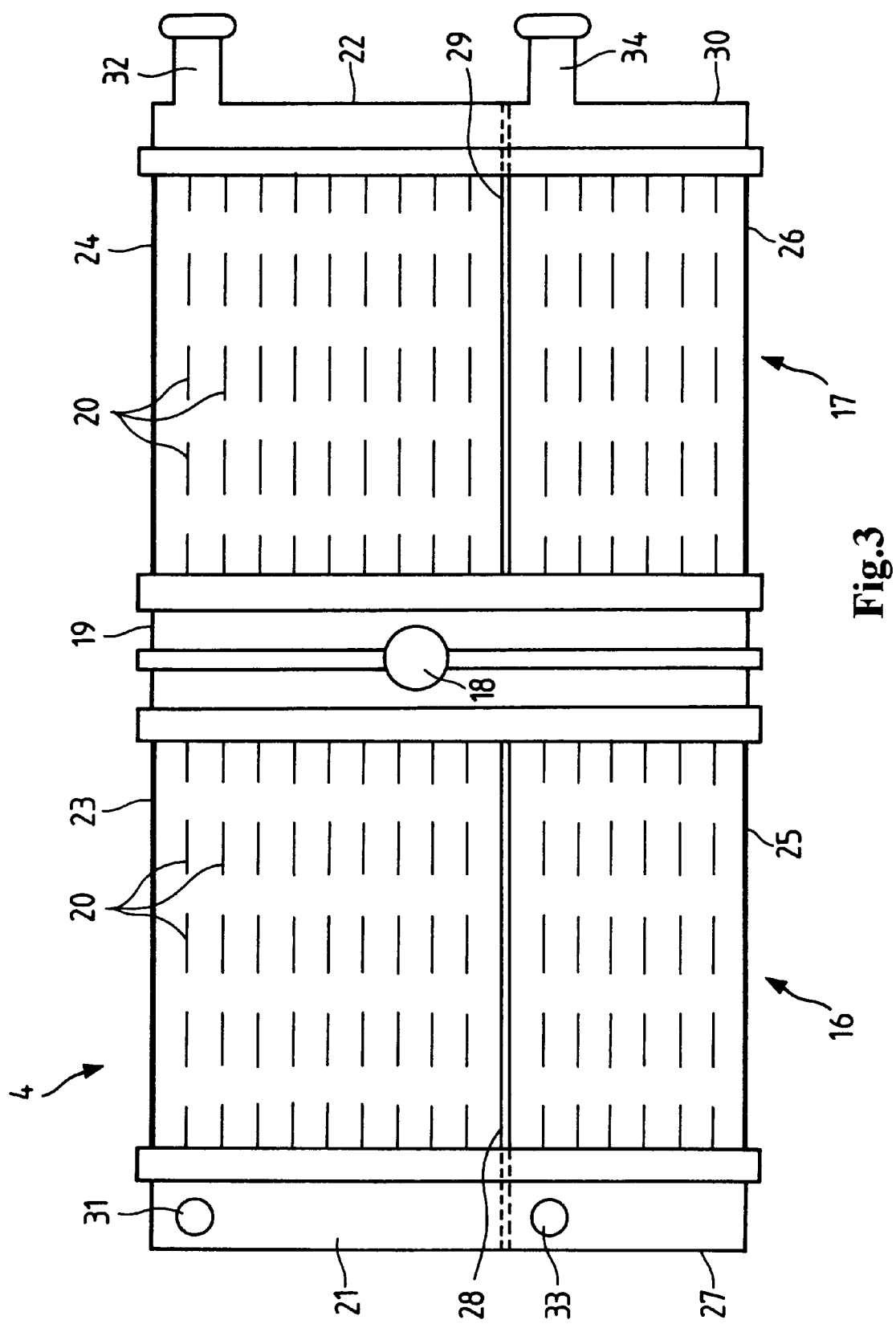
FIG. 3 is a front view of a heater unit according to the present invention.
Figure 4:
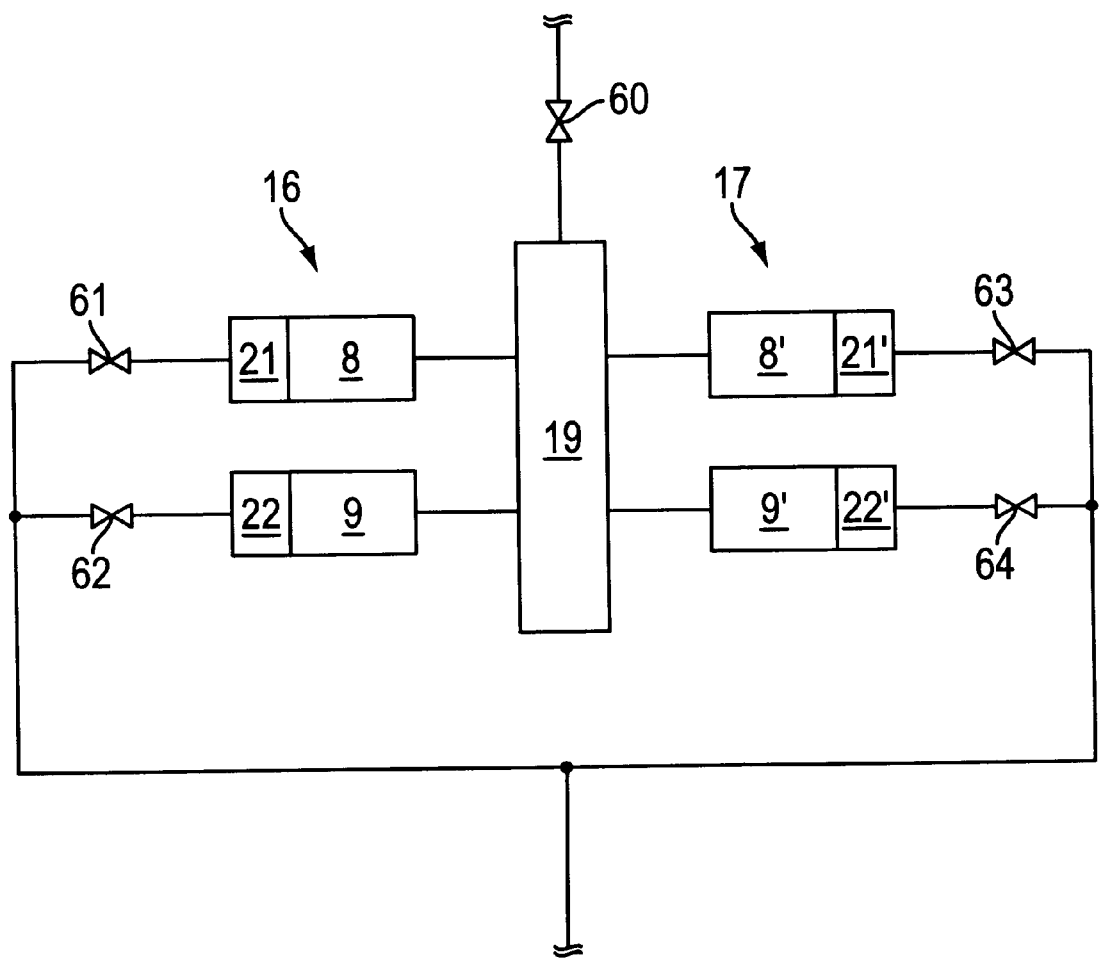
FIG. 4 is a schematic illustration of a liquid flow control system according to the present invention.

According to a preferred embodiment of the invention, the heater 4 comprises separate segments. As shown in FIGS. 3 and 4, the heater 4 consists of a first side portion 16 and a second side portion 17. Coolant is supplied through the liquid valve 60 to an inlet opening 18 in a central tank 19 arranged between the two side portions 16,17. The coolant flows out of the central tank 19 through horizontal tubes 20 in the upper heater core segment 8' of the side portion 16 to a first end tank 21, and through horizontal tubes 20 in the upper heater core segment 8' of the side portion 17 to a second end tank 21'.

The heater side portions 16,17 are divided into upper segments 8,8' and lower segments 9,9', respectively. Partitions 28,29 extending outward from the central tank 19 divide the heater side portions 16,17 into the upper 8,8' and lower 9,9' heater core segments, respectively. Coolant exits the heater unit 4 through outlet openings 31,32,33,34 in the segments 8,8',9,9', respectively.

According to one feature of the invention, liquid valves 61,63 can be used to control engine coolant flow through the upper segments 8,8', and air flaps (not shown) can be used to control air flow through the lower segments 9,9'. This also enables the temperature settings for the front and rear sections of a side compartment to be controlled substantially independently of one another.

According to another feature of the invention, the tubes 20 of the lower segments 9,9' can be designed in such a way that air streams conducted through the foot ducts 10 are heated to a higher temperature than air streams conducted through the foot ducts 7. For example, turbulence inducing inserts in the heat-conducting tubes 20 of the lower segments 9,9' cause eddying of the coolant which improves thermal transmission.

Figure 2:
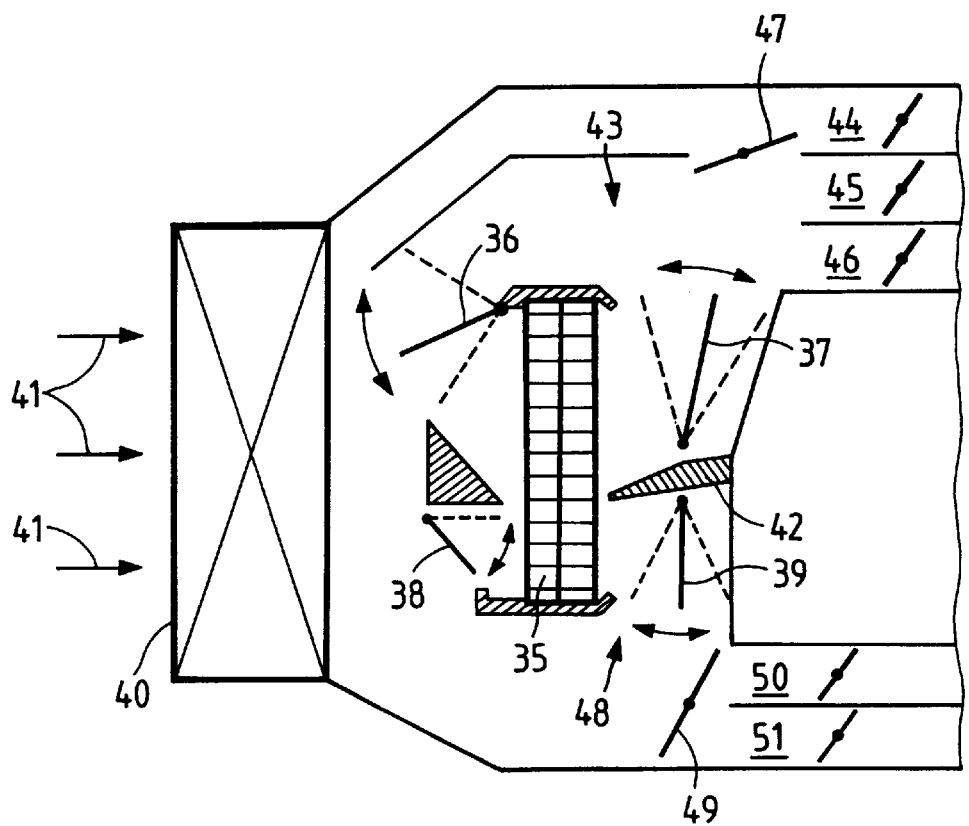
FIG. 2 is a schematic illustration of a conditioned air unit according to a second embodiment of the present invention.

Another embodiment of the present invention is shown in FIG. 2 wherein independent temperature settings for various regions of a passenger compartment are provided exclusively with air valves (e.g., mixing flaps) controlling air flow through a heater unit 35. An upper mixing flap 36 is located upstream of the heater 35, and a secondary mixing flap 37 is located downstream of the heater 35 to control the quantity of air flow to the front compartment. For air flow through a lower portion of the heater 35, a lower mixing flap 38 is located upstream of the heater 35, and a secondary mixing flap 39 is located downstream of the heater 35 to control the quantity of air flow to the rear compartment. An input air stream 41 is cooled as it passes through a refrigerant evaporator 40. The positions of mixing flaps 36,37, 38,39 enable independent temperature settings for the front and rear compartments.

Above a partition 42 is formed an upper air distribution chamber 43 from which temperature-conditioned air is conducted into the front passenger compartment through a ventilation duct 44, a defroster duct 45, and a foot duct 46. The air stream conducted by ventilation duct 44 passes through the refrigerant evaporator 40 and bypasses the heater 35. A pivoting flap 47 is arranged in the upper air distribution chamber 43 to mix heated air in the air stream conducted through the ventilation duct 44.

Below the partition 42 is formed a lower air distribution compartment 48 from which temperature-conditioned air is conducted to the rear passenger compartment. A pivoting flap 49 is arranged in the lower air distribution chamber 48 at the entrances to a foot duct 50 and a ventilation duct 51. The pivoting flap 49 mixes cooled air from the refrigerant evaporator 40 in the air streams conducted through both the foot duct 50 and the ventilation duct 51.

This embodiment of the invention also enables the temperature settings for the different regions within the front and rear zones of a side compartment to be controlled substantially independently of one another.

Segmenting of the heater as illustrated in FIGS. 1, 3 and 4 reduces the interior space required by the conditioned air unit while meeting the user's increased demands for convenience and flexible control. Alternatively, the same convenience and flexibility can also be ensured using an unsegmented heater, i.e., having a single heater core, with the mixing flaps as illustrated in FIG. 2. The arrangement of the ducts and the mixing flaps in close proximity to the heater unit, as illustrated in FIG. 2, achieves the same effects as the conditioned air unit illustrated in FIG. 1.

As an alternative or in addition to the horizontal tubes 20 illustrated in FIG. 3, the heater 4 can have upright, vertical tubes. Automatic temperature layering results as the temperature of the coolant decreases uniformly from a region at the vertical position of the inlet opening 18 to the vertical position of the outlet openings near the upper and lower ends of the heater 4. Consequently, a higher temperature setting is possible for the foot duct 7 as compared to the ventilation duct 5. Similarly, the foot duct 10, which is nearer to the inlet opening 18, conducts an air stream of a higher temperature than the ventilation duct 11.

Additional advantages and modifications will readily occur to those skilled in the art. Therefore, the invention in its broader aspects is not limited to the specific details and representative devices that are shown and described herein. Accordingly, various modifications may be made without departing from the spirit and scope of the general inventive concept as defined by the appended claims and their equivalents.

What is claimed is:

1. A unit for conditioning air for a motor vehicle compartment having four zones, a front driver side zone, a front passenger side zone, a rear left passenger side zone, and a rear right passenger side zone, the unit comprising:
    an air cooling unit that cools air;
    a heater unit arranged downstream of the air cooling unit and having an upper left portion, an upper right portion, a lower left portion, and a lower right portion adapted to heat respectively the front driver side, the front passenger side, the rear left passenger side, and the rear right passenger side zones;
    first, second, third, and fourth ventilation ducts adapted to convey cooled, ambient, or heated air respectively to the front driver side, the front passenger side, the rear left side, and the rear right side;
    first, second, third, and fourth foot ducts adapted to convey at least heated air from the heater unit respectively to the front driver side, the front passenger side, the rear left side, and the rear right side;
    first and second defroster ducts adapted to convey cooled, ambient, or heated air respectively to the front driver side and the front passenger side; and
    a plurality of air valves positioned adjacent to and downstream of the heater unit and a plurality of air valves positioned adjacent to and upstream of the heater unit for independently controlling air entering and exiting the respective upper left, upper right, lower left, and lower right portions of the heater unit to set the temperature of the conditioned air in each zone to set four zones independently of one another,
    wherein the plurality of air valves upstream of the heater unit include:
        a first upstream air valve for controlling cooled or ambient air flow to the upper left portion of the heater unit and to the first defroster and foot ducts;
        a second upstream air valve for controlling cooled or ambient air flow to the upper right portion of the heater unit and to the second defroster and foot ducts;
        a third upstream air valve for controlling cooled or ambient air flow to the lower left portion of the heater unit;
        a fourth upstream air valve for controlling cooled or ambient air flow to the lower right portion of the heater unit, and
    wherein the air valves downstream of the heater unit include:
        a first downstream air valve for controlling heated air flow from the upper left portion of the heater unit to the first ventilation, defroster, and foot ducts;
        a second downstream air valve for controlling heated air flow from the upper right upper portion of the heater unit to the second ventilation, defroster and foot ducts;
        a third downstream air valve for controlling heated air flow from the lower left portion of the heater unit to the third ventilation and foot ducts; and
        a fourth downstream air valve for controlling heated air flow from the lower right portion of the heater unit to the fourth ventilation and foot ducts, and
    wherein the unit further includes:
        first pivoting flap for diverting cooled or ambient air, or heated air from the upper left portion of the heater unit to the first ventilation duct;
        a second pivoting flap for diverting cooled or ambient air, or heated air from the upper right portion of the heater unit to the second ventilation duct;
        a third pivoting flap for diverting cooled or ambient air, or heated air from the lower left portion of the heater unit to the third ventilation and foot ducts; and
        a fourth pivoting flap for diverting cooled or ambient air, or heated air from the lower left portion of the heater unit to the fourth ventilation and foot ducts.

2. The unit according to claim 1, wherein the heater unit comprises a liquid-to-air heat exchanger.

3. The unit according to claim 2, wherein engine coolant for the motor vehicle is adapted to be circulated through the liquid-to-air heat exchanger.

4. The unit according to claim 1, wherein the air cooling unit comprises a refrigerant evaporator upstream of the heater unit for cooling the input air.

5. The unit according to claim 4, further including a fan upstream of the air cooling unit that moves the input air.

6. A unit for conditioning air in a motor vehicle compartment, the motor vehicle compartment being divided into a front right section, a rear right section, a front left section, and a rear left section, the unit comprising:
    a heater unit having an upper left portion, an upper right portion, a lower left portion, and a lower right portion adapted to heat cooled or ambient air supplied to the front left section, the front right section, the rear left section, and the rear right section, respectively;
    an air cooling unit comprising a refrigerant evaporator upstream of the heater unit for cooling input air;
    first, second, third, and fourth foot ducts adapted to convey conditioned air to respective first, second, third, and fourth foot regions of the front left, front right, rear left, and rear right sections;
    first and second defroster ducts adapted to convey conditioned air to respective first and second defrost regions of the front left and right sections;
    first, second, third, and fourth ventilation ducts adapted to convey conditioned air to respective first, second, third, and fourth ventilation regions of the front left, front right, rear left, and rear right sections; and a plurality of air valves positioned adjacent to and upstream of the air heater and a plurality of air valves positioned adjacent to and downstream of the heater unit for independently controlling air entering and exiting the respective upper left, upper right, lower left, and lower right portions of the heater unit to set the temperature of the conditioned air in each section to set the front left, front right, rear left, and rear right sections independently of one another, wherein the air valves upstream of the heater unit comprise:

a first upstream air valve for controlling cooled or ambient air flow to the upper left portion of the heater unit and to the first defroster and foot ducts;

a second upstream air valve for controlling cooled or ambient air flow to the upper right portion of the heater unit and to the second defroster and foot ducts;

a third upstream air valve for controlling cooled or ambient air flow to the lower left portion of the heater unit;

a fourth downstream air valve for controlling cooled or ambient air flow to the lower right portion of the heater unit, and wherein the air valves downstream of the heater unit include:

a first downstream air valve for controlling heated air flow from the upper left portion of the heater unit to the first ventilation, defroster, and foot ducts;

a second downstream air valve for controlling heated air flow from the upper right portion of the heater unit to the second ventilation, defroster, and foot ducts;

a third downstream air valve for controlling heated air flow from the lower left portion of the heater unit to the third ventilation and foot ducts; and a fourth downstream air valve for controlling heated air flow from the lower right portion of the heater unit to the fourth ventilation and foot ducts, and wherein the unit further includes:

a first pivoting flap for diverting cooled or ambient air, or heated air from the upper left portion of the heater unit to the first ventilation duct;

a second pivoting flap for diverting cooled or ambient air, or heated air from the upper right portion of the heater unit to the second ventilation duct;

a third pivoting flap for diverting cooled or ambient air, or heated air from the lower left portion of the heater unit to the third ventilation and foot ducts; and a fourth pivoting flap for diverting cooled or ambient air, or heated air from the lower left portion of the heater unit to the fourth ventilation and foot ducts.

* * * * *